(12) United States Patent
Moy et al.

(10) Patent No.: US 8,378,012 B2
(45) Date of Patent: Feb. 19, 2013

(54) FLAME RETARDANT COMPOSITION AND HYDROLYSIS-SUSCEPTIBLE RESIN CONTAINING SAME

(75) Inventors: Paul Y. Moy, Fishkill, NY (US);
Danielle A. Bright, New City, NY (US);
Leslie Bright, legal representative, New City, NY (US)

(73) Assignee: ICL-IP America Inc., Ardsley, NY (US)

( * ) Notice: Subject to any disclaimer, the term of this patent is extended or adjusted under 35 U.S.C. 154(b) by 745 days.

(21) Appl. No.: 12/084,592

(22) PCT Filed: Nov. 7, 2006

(86) PCT No.: PCT/US2006/043491
§ 371 (c)(1),
(2), (4) Date: Aug. 25, 2009

(87) PCT Pub. No.: WO2007/054340
PCT Pub. Date: May 18, 2007

(65) Prior Publication Data
US 2010/0044654 A1      Feb. 25, 2010

Related U.S. Application Data

(60) Provisional application No. 60/734,545, filed on Nov. 8, 2005.

(51) Int. Cl.
C08K 5/521 (2006.01)
C98K 5/523 (2006.01)
C09K 21/12 (2006.01)
C09K 21/14 (2006.01)

(52) U.S. Cl. ........ 524/127; 524/147; 524/123; 524/124; 524/126; 524/130; 524/136; 524/436; 524/437; 252/609

(58) Field of Classification Search ............ 252/609; 524/121, 123, 124, 126, 127, 130, 136, 147, 524/436, 437
See application file for complete search history.

(56) References Cited

U.S. PATENT DOCUMENTS

| | | | |
|---|---|---|---|
| 4,102,859 A | 7/1978 | Eimers et al. | |
| 4,472,554 A | 9/1984 | Grigo et al. | |
| 5,616,768 A | 4/1997 | Kawata et al. | |
| 5,618,867 A | 4/1997 | Bright et al. | |
| 6,166,114 A * | 12/2000 | Cosstick et al. | 524/100 |
| 6,268,418 B1 * | 7/2001 | Magerstedt et al. | 524/125 |
| 6,319,432 B1 * | 11/2001 | Harrod et al. | 252/609 |
| 6,403,683 B1 | 6/2002 | Kobayashi | |
| 6,498,228 B1 | 12/2002 | Nodera et al. | |
| 6,617,379 B2 | 9/2003 | Worku et al. | |
| 6,866,376 B2 | 3/2005 | Maeda et al. | |
| 7,115,677 B2 * | 10/2006 | Harashina et al. | 523/205 |
| 2003/0105209 A1 * | 6/2003 | Chung et al. | 524/451 |
| 2003/0171463 A1 | 9/2003 | Weinberg et al. | |
| 2004/0009428 A1 * | 1/2004 | Tamura et al. | 430/280.1 |
| 2004/0034132 A1 * | 2/2004 | Campbell et al. | 524/184 |
| 2004/0127611 A1 | 7/2004 | Yamanaka et al. | |
| 2004/0266916 A1 * | 12/2004 | Harashina et al. | 523/217 |
| 2005/0009970 A1 | 1/2005 | Seidel et al. | |
| 2005/0250885 A1 * | 11/2005 | Mercx et al. | 524/99 |
| 2006/0079615 A1 * | 4/2006 | DeRudder et al. | 524/128 |

FOREIGN PATENT DOCUMENTS

| | | |
|---|---|---|
| EP | 0860470 | 8/1998 |
| WO | 03/048247 | 6/2003 |
| WO | 2004/000922 | 12/2003 |

OTHER PUBLICATIONS

International Search Report dated Apr. 13, 2007 with Written Opinion of the International Searching Authority.

* cited by examiner

*Primary Examiner* — Joseph D Anthony
(74) *Attorney, Agent, or Firm* — Dilworth & Barrese LLP

(57) ABSTRACT

A flame retardant composition is provided which contains at least one phosphate ester containing at least one acidic substance resulting from the process of its manufacture, at least one acidity-reducing hydrotalcite and, optionally, at least one acidity-reducing oxetane. The flame retardant composition is especially useful for addition to resins that are susceptible to hydrolytic degradation such as polyesters and polycarbonates, and to resin blends (alloys) containing one or more of such resins, e.g., a blend of polycarbonate and acrylonitrile butadiene-styrene terpolymer.

11 Claims, No Drawings

FLAME RETARDANT COMPOSITION AND HYDROLYSIS-SUSCEPTIBLE RESIN CONTAINING SAME

This application claims priority under 35 U.S.C. §119(e) to U.S. Provisional Application No. 60/734,545 filed on Nov. 8, 2005.

BACKGROUND OF THE INVENTION

This invention relates to a flame-retardant composition and to a resinous composition containing same. More particularly, this invention relates to a crude phosphate ester flame retardant composition of reduced acidity and to a hydrolysis-susceptible resin containing the aforesaid flame retardant composition.

Phosphate esters are widely used as halogen-free, flame retardants for addition to engineering plastics, e.g., polyphenylene oxide/high-impact polystyrene and poplycarbonate/acrylonitrile-butadiene-styrene blends. A disadvantage associated with phosphate esters such as resorcinol bis(diphenyl phosphate) and bisphenol A bis(diphenyl phosphate) is the difficulty of preparing them in a purity meeting the stringent requirements of the polymer industry.

In the preparation of phenylphosphate esters starting either from phosphorus oxychloride, an aromatic diol and phenol or a phenylchlorophosphate and an aromatic diol, the presence of any moisture in the starting materials may result in an increase in the acidity of the final product which will cause hydrolytic instability in hydrolysis-susceptible resins and blends of such resins when incorporated therein. In general, in order to reduce the content of acidic impurities in phenylphosphate esters, neutralization with an alkaline metal hydroxide or other basis compound such as magnesium hydroxide is carried out, followed by multiple water washes and distillation to obtain the pure phenylphosphate esters. Formation of undesirable emulsions with the phenylphosphate esters may accompany such methods.

U.S. Pat. No. 5,616,768 discloses an involved multi-step process for producing phenylphosphate esters of low acidity wherein a crude phenylphosphate ester product is treated with an epoxy compound and the resultant material is heated in the presence of water, washed with water, the residual water removed by distillation. This process is capital intensive and uneconomical to carry out.

It is an object of the present invention to provide a phosphate ester flame retardant composition of low acidity which can be simply and economically produced.

It is a further object of the invention to provide such a flame retardant composition for resins that are susceptible to hydrolysis and a consequent degradation of their useful properties, in particular, for polycarbonates, polyesters and their blends.

It is a further particular object of the invention to provide a hydrolytically stable blend of polycarbonate and a styrene-based resin such as acrylonitrile-butadiene-styrene (ABS) copolymer containing as a flame retardant component thereof a phosphate ester of low acidity.

BRIEF DESCRIPTION OF THE INVENTION

In keeping with these and related objects of the invention, there is provided a flame retardant composition comprising at least one phosphate ester flame-retardant containing at least one acidic substance and an acidity-reducing amount of at least one hydrotalcite and, optionally, at least one oxetane.

Further in keeping with the invention, there is provided a resinous composition comprising at least one hydrolysis-susceptible resin, a flame retardant effective amount of a flame retardant composition comprising at least one phosphate ester flame-retardant containing at least one acidic substance and an acidity-reducing amount of at least one hydrotalcite and, optionally, at least one oxetane.

DETAILED DESCRIPTION OF THE INVENTION

The flame retardant composition of this invention contains at least one phosphate ester-based flame retardant and at least one hydrotalcite.

A preferred phosphate ester-based flame retardant is represented by the following formula (I):

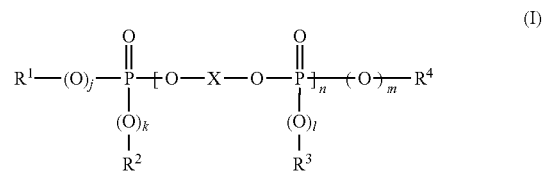

wherein X is the residue of a $C_2$-$C_{30}$ dihydroxy compound or a $C_6$-$C_{30}$-dihydroxy aryl compound, $R^1$, $R^2$, $R^3$ and $R^4$ each independently is $C_1$-$C_8$-alkyl, $C_3$-$C_8$-cycloalkyl or $C_6$-$C_{20}$-aryl, j, k, l and m each independently is 0 or 1, and n is 0 or 1 to 5.

In phosphate ester (I), j, k, l, and m are each preferably is 1, n is preferably 0 or 1 to 3 and more preferably 0 or 1, X is the residue of an aromatic dihydroxy compound such as hydroquinone, resorcinol, bis(4-hydroxydiphenyl)methane, bisphenol A, dihydroxydiphenyl, dihydroxynapthalene, bis(4-hydroxyphenyl)sulfone, bis(4-hydroxyphenyl)ketone and bis(4-hydroxyphenyl)sulfide, and is preferably the residue of hydroquinone, resorcinol or bisphenol A, and $R^1$, $R^2$, $R^3$ and $R^4$ each is the residue of an aromatic monohydroxy compound such as phenol, cresol, xylenol, isopropylphenol, butylphenol and p-cumylphenol, and is preferably the residue of phenol, cresol or xylenol.

Suitable phosphate esters include resorcinol bis(diphenyl phosphate) (Fyroflex® RDP, Supresta, Ardsley, N.Y.), bisphenol A bis(diphenyl phosphate) (Fyroflex® BDP, Supresta, Ardsley, N.Y.), neopentyl glycol bis(diphenyl phosphate), propylene glycol bis(diphenyl phosphate), and their combinations. Of these phosphate esters, resorcinol bis(diphenyl phosphate) and bisphenol A bis(diphenyl phosphate) are generally preferred.

Phosphate esters of formula (I) can be prepared by any one of several known and conventional processes, e.g., the reaction of phosphorus oxychloride with an aromatic dihydroxy compound such as any of those aforementioned, in the presence of a Lewis acid catalyst, e.g., aluminum chloride, magnesium chloride or titanium tetrachloride, etc., removing unreacted phosphorus oxychloride from the resulting reaction mixture and thereafter reacting the latter with an aromatic monohydroxy compound such as any of those aforementioned to provide an aromatic phosphate ester. In a variation of this process, an aromatic phosphate ester is obtained by reacting phosphorus oxychloride with a mixture of aromatic monohydroxy compound and aromatic dihydroxy compound.

These and similar processes yield crude aromatic phosphate esters containing one or more acidic substances that may induce or promote hydrolysis in resins that are susceptible thereto, e.g., polyesters, polycarbonates, and the like, and polymer alloys containing one or more of these and/or other resins that are susceptible to hydrolysis, e.g., blends of polycarbonate and rubbery (elastomeric) resins such as acrylonitrile-butadiene-styrene terpolymers.

The flame retardant composition of this invention contains at least one hydrotalcite which reduces the acidity of the phosphate ester(s). Hydrotalcites are synthetic or natural minerals of the general formula:

$$M^{2+}_{(1-x)}M^{3+}_x(OH)_2A''_{x/2}\cdot mH_2O$$

wherein $M^{2+}$ is a divalent metal ion, preferably $Mg^{2+}$, $M^{3+}$ is a trivalent metal ion, preferably $Al^{3+}$, $A''$ is an n-valent anion, preferably $CO_3^{2-}$ or $SO_4^{2-}$, n is an integer greater than 0, preferably 2, x is 0 to 0.5, preferably 0 to 0.33, and m≧0.

Suitable hydrotalcites include hydrous or anhydrous basic carbonates of magnesium, calcium, zinc, aluminum, bismuth. These hydrotalcites can be natural or synthetic. Examples of natural hydrotalcites include one represented by the structural formula $Mg_6Al_2(OH)_{16}CO_3\cdot 4H_2O$. Examples of synthetic hydrotalcites include $Mg_{0.7}Al_{0.3}(OH)_2(CO_3)_{0.15}\cdot 0.54H_2O$, $Mg_{4.5}Al_2(OH)13CO_3\cdot 3.5H_2O$, $Mg_{4.2}Al_2(OH)_{12.4}CO_3$, $Mg_{4.3}Al_2(OH)_{12.6}CO_3\cdot 4H_2O$, $Zn_6Al_2(OH)_{16}CO_3\cdot 4H_2O$, $Ca_6Al_2(OH)_{16}CO_3\cdot 4H_2O$, and $Mg_{14}Bi_2(OH)_{29.6}\cdot 4.2H_2O$.

In general, the flame retardant composition of this invention will contain an amount of hydrotalcite(s) that will effect a significant reduction in the acidity of the crude phosphate ester component(s) of the composition and, consequently, an increase in the stability of the host resin/alloy to hydrolytic degradation. Depending on the original acid number of the crude, i.e., acid substance-containing, phosphate ester(s), the hydrotalcite(s) can be added thereto so as to reduce the acid number by at least 10 percent, preferably by at least 25 percent and more preferably by at least 50 percent. Known and conventional experimental testing can be utilized to determine optimum hydrotalcite levels in a given phosphate ester flame retardant or mixture of phosphate ester flame retardants and host resin/alloy system.

Optionally, and in accordance with the disclosure of WO 2004/000922, the entire contents of which are incorporated by reference herein, the flame retardant composition herein can also contain one or more oxetane compounds which also serve to reduce the acidity of the crude phosphate ester component(s) of the flame retardant composition thereby increasing the stability of the host resin/alloy containing the composition to hydrolytic degradation.

Suitable oxetane compounds contain one or more oxetane rings, i.e., a ring of the structure:

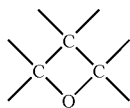

Useful oxetane compounds containing a single oxetane ring include those of general formula (II):

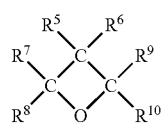

(II)

wherein $R^5$, $R^6$, $R^7$, $R^8$, $R^9$ and $R^{10}$ each independently is hydrogen, $C_1$-$C_{18}$-alkyl, $C_3$-$C_{12}$-cycloalkyl, $C_6$-$C_{15}$-aryl, $C_7$-$C_{15}$-aralkyl or a radical —$CH_2O$—R'', wherein R'' is hydrogen, $C_1$-$C_{18}$-alkyl, $C_3$-$C_{12}$-cycloalkyl, $C_6$-$C_{15}$-aryl, $C_7$-$C_{15}$-aralkyl or an acyl radical of a monobasic or polybasic carboxylic acid or of an inorganic acid.

Examples of oxetane compounds of formula (II) are those for which the preparation is described in E. J. Goethals, *Ind. Chim. Belge.*, T 30 No. 6, page 556 et seq., e.g., 2,2-diphenyl-3,4-dimethyloxetane and 2,2-diphenyl-3,3-dimethyloxetane.

Additional useful oxetane compounds are those described in DOS (German Published Specification) 1,907,117, such as 3-ethyl-oxetanyl-(3)-carboxylic acid ethyl ester, 3-ethyl-oxetanyl-(3)-carboxylic acid [3-ethyl-oxetanyl-(3)]-methyl ester and 3-amyl-oxetanyl-(3)-carboxylic acid [3-amyloxetanyl-(3)]-methyl ester.

Particularly suitable oxetane compounds are those of general formula (III):

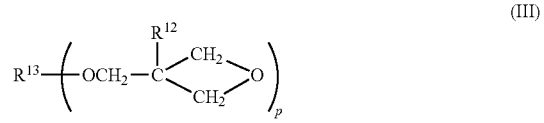

(III)

wherein $R^{12}$ is hydrogen, $C_1$-$C_{18}$-alkyl, $C_1$-$C_{18}$-hydroxyalkyl, $C_6$-$C_{15}$-aryl, $(C_6$-$C_{15}$-aryl)-oxymethyl, $C_7$-$C_{15}$-aralkyl or $(C_7$-$C_{15}$-aralkyl)-oxymethyl, $R^{13}$ is hydrogen, $C_1$-$C_{18}$-alkyl, $C_6$-$C_{15}$-aryl, $C_7$-$C_{15}$-aralkyl or the acyl radical of a monobasic or polybasic carboxylic acid or inorganic acid, and p is an integer which has a value of 1 or is equal to the acid functionality of the acid from which the acid radical $R^{13}$ is derived.

Compounds wherein $R^{13}$ is hydrogen or an acyl radical are particularly preferred. Examples which may be mentioned are 3-hydroxymethyl-3-methyloxetane, 3-hydroxymethyl-3-ethyloxetane, 3-hydroxymethyl-3-amyloxetane, 3-hydroxymethyl-3-phenoxymethyloxetane, 3-hydroxymethyl-3-p-tert.-butyl-phenoxymethyloxetane, 3,3-bis-hydroxymethyloxetane, 3-hydroxymethyl-3-octyloxetane, 3-hydroxymethyl-3-benzyloxetane, 3-phenoxymethyl-3-ethyloxetane, 3-octadecyloxymethyl-3-ethyloxetane, 3-phenoxymethyl-3-amyloxetane, [3-ethyloxetanyl-(3)]-methyl benzoate, [3-methyl-oxetanyl-(3)]-methyl cinnamate, [3-ethyloxetanyl-(3)]-methyl stearate, [3-amyl-oxetanyl-(3)]-methyl acrylate and esters of polybasic carboxylic acids and inorganic acids such as carbonic acid, oxalic acid, malonic acid, succinic acid, adipic acid, citraconic acid, citric acid, tartaric acid, diglycollic acid, thiodiglycollic acid, cyclohexane-1,2-dicarboxylic acid, cyclohex-4-ene-1,2-dicarboxylic acid, o-, iso- and terephthalic acid, endomethylenetetrahydrophthalic acid, biphenylene-4,4'-dicarboxylic acid, trimellitic acid, pyromellitic acid, and the like.

In addition to the esters of the above-mentioned acids which exclusively contain the radicals of oxetane-containing alcohols, also useful are mixed esters of the foregoing acids which in addition to at least one radical of an oxetane-containing alcohol also contain one or more radicals of other monohydric or polyhydric alcohols or phenols as ester groups. Radicals of the following alcohols can be contained in these ester groups: methanol, ethanol, isopropyl alcohol, n-propyl alcohol, n-, sec- and tert-butyl alcohol, isobutyl alcohol, 2-ethylhexanol, octyl alcohol and isooctyl alcohol, decyl alcohol, lauryl alcohol, octadecyl alcohol, allyl alcohol, methallyl alcohol, geraniol, propargyl alcohol, cyclohexyl alcohol, cyclohexylcarbinol, benzyl alcohol, beta-phenylethyl alcohol, cinnamyl alcohol, phenol, alpha- and beta-naphthol, 2,6-di-tert-butyl-p-cresol, o-cyclohexylphenol, p-propylphenol, o- and p-propenylphenol and also alcohols and phenols containing ether groups such as, for example, ethylene glycol monomethyl ether, ethylene glycol monobutyl ether, phenoxyethanol, hydroquinone mono methyl ether and hydroquinone monobutyl ether, and also polyhydric alcohols and phenols, such as ethylene glycol, 1,2-propylene glycol, 1,2-butanediol, 1,4-butanediol, 1,3-butanediol, 1,4-bishydroxymethylcyclohexane, 1,9-dihydroxyoctadecane, 1,6-hexanediol, 2,2-dimethyl-1,3-propanediol, glycerol, 1,1,1-tris-hydroxymethylpropane, 1,1,1-trishydroxymethylhexane, 1,1,1-tris-hydroxymethylethane, pentaerythritol, pentaerythritol monoalkyl ethers and pentaerythritol dialkyl ethers, sorbitol, methylglucose, hydroquinone, resorcinol, pyrocatechol, pyrogallol, phloroglucitol and 2,2-bis-(hydroxyphenyl)-propane.

According to the invention, one can employ individual oxetane compounds such as any of the aforementioned or mixtures thereof together with individual phosphate esters or mixtures of phosphate esters.

In general, the phosphate ester-containing flame retardant composition herein can contain an amount of optional oxetane compound(s) that will supplement or enhance the acidity-reducing effect of the hydrotalcite component(s) of the composition thereby imparting yet a further degree of stability to the host resin/alloy against hydrolytic degradation. The total amount of stabilizing combination of hydrotalcite and oxetane that can be added to the phosphate ester will advantageously be that which will reduce its acid number by at least 10 percent, preferably by at least 25 percent and more preferably by at least 50 percent. In such combinations, the hydrotalcite to oxetane weight ratio can vary from about 20:1 to about 1:20 and preferably from about 10:1 to about 1:10.

As stated above, the flame retardant composition of this invention is especially useful for addition to resins characterized by susceptibility to degradation by hydrolysis and to blends, or alloys, containing one or more of such resins. In particular, it is advantageous to incorporate the flame-retardant composition of this invention in effective flame-retardant amounts in such hydrolysis-susceptible resins as the polyesters, e.g., alkylene polyesters of terephthalic acid such as polyethylene terephthalate, polybutylene terephthalate, poly-1,4-cyclohexane-dimethylene terephthalate, and the like, and especially the polycarbonates and blends thereof with rubbery polymers such as acrylonitrile-butadiene-styrene terpolymers. Polycarbonates and their blends that are among those that are useful herein include those described in U.S. Pat. No. 6,498,228, the contents of which are incorporated by reference herein.

The flame retardant composition can be added to the host resin or resin blend as a pre-blended mixture of its phosphate ester, hydrotalcite and optional oxetane components or these components can be added in any sub-combination or sequentially to the resin/resin blend. All known and conventional techniques of addition are contemplated. The amount of phosphate ester component to be added will be at least a flame retarding amount thereof which for many resins and resin blends can vary from about 0.5 to about 50, preferably from about 3 to about 25, and more preferably from about 4-15, parts per hundred.

The resins and resin blends, in addition to the flame retardant composition of this invention, can contain one or more other additives in known and conventional amounts, e.g., antioxidants, UV stabilizers, plasticizers, fillers, reinforcements, pigments, colorants, other flame retardants, and the like, as is well known to those skilled in the art.

COMPARATIVE EXAMPLES 1-7; EXAMPLES 1-10

The hydrolytic stability of test Composites A and B (alloys of commercially available polycarbonate and arylonitrile-butadiene-styrene terpolymer) were evaluated by measuring the retained molecular weight distribution of the samples of the composites after various periods of exposure to high humidity at elevated temperature.

Identical amounts of test composites in the form of pellets of substantially uniform dimensions were placed in small vials together with identical amounts of de-ionized water, the vials were sealed and then heated to 107° C. for 0, 30 and 90 hours. Thereafter, the pellets were removed from the water and extracted with solvent to isolate polycarbonate which was then analyzed by gas phase chromatography (GPC) to measure any reduction in its molecular weight.

A. General Formulations of the Test Composites

The following components were utilized in the test composite formulations:

| Component | Description |
|---|---|
| PC | polycarbonate |
| ABS | acrylonitrile-butadiene-styrene terpolymer |
| Flame Retardant A ("FR-A") | resorcinol bis(diphenyl phosphate), Fyroflex ® RDP, Supresta, Ardsley, NY |
| Flame Retardant B ("FR-B") | bisphenol A bis(diphenyl phosphate), Fyroflex ® BDP, Supresta, Ardsley, NY |
| Anti-drip aid | Teflon ® fluoropolymer, DuPont |
| Oxetane OXT-101 ("OXT-101") | 3-ethyl-3-hydroxymethyloxetane, Toagosei Co., Ltd. |
| Hydrotalcite ("HTC") | Synthetic hydrotalcite of the nominal formula $Mg_{4.3}Al_2(OH)_{12.6}CO_3 \cdot 4H_2O$ (DHT-4A, Kyowa Chemical Industry Co., Ltd.) |

Test Composites A and B were prepared employing the above-identified components in the amounts indicated below:

| Component | Composite A, Component % by Weight | Composite B, Component % by Weight |
|---|---|---|
| PC | 72.50 | 69.20 |
| ABS | 18.20 | 18.20 |
| FR-A | 9.00 | — |
| FR-B | — | 12.30 |
| Anti-drip aid | 0.30 | 0.30 |
| OXT-101 | Variable | variable |
| HTC | Variable | variable |

The components of Composites A and B were premixed prior to melt blending in a Brabender twin screw extruder. HTC, OXT-101 and combined HCT and OXT-101 where utilized were blended in the composite mixture either as the neat additive or pre-milled (by a 3-roll mill) as a fine dispersed slurry in the host flame retardant liquid (either FR-A or FR-B). The extruded composites were pelletized, dried of excess moisture in forced air ovens for at least six hours (+60° C.) and injection molded into samples for hydrolytic stability evaluation (variable exposure times at 107° C./high moisture as indicated above) and Izod impact testing.

TABLE 1

HYDROLYTIC STABILITY AND IZOD IMPACT TEST RESULTS FOR COMPOSITE A

| Comparative Example/Example | Stabilizing Additive HTC, ppm | Stabilizing Additive OXT-101, ppm | Hydrolytic Stability as Indicated by Reduction in Mw 0 hr. | Hydrolytic Stability as Indicated by Reduction in Mw 30 hr. | Hydrolytic Stability as Indicated by Reduction in Mw 90 hr. | Notched Izod Impact Value (ASTM-256 test protocol), ft/lb/in |
|---|---|---|---|---|---|---|
| Comparative Example 1 (control) | — | — | 55,000 | 46,000 | 24,000 | 11.1 H |
| Comparative Example 2 | — | 20,000 | 55,000 | 46,000 | 39,000 | 9.9 H |
| Comparative Example 3 | — | 15,000 | 56,000 | 50,000 | 34,000 | 12.1 H |
| Comparative Example 4 | — | 10,000 | 56,000 | 50,000 | 44,000 | 11.7 H |
| Comparative Example 5 | — | 5,000 | 56,000 | 49,000 | 37,000 | 11.3 H |
| Example 1* | 10,000 | — | 53,000 | 49,000 | 43,000 | 2.3 B |
| Example 2* | 5,000 | — | 53,000 | 48,000 | 35,000 | 2.4 B |
| Example 3* | 2,500 | — | 53,000 | 46,000 | 21,000 | 10.0 H |
| Example 4** | 4,000 | — | 53,000 | 39,000 | 19,000 | 11.0 H |

*HTC added as a slurry
**HTC added neat.
"H" - sample "hinged" upon impact in the notched area
"B" - sample fully fractured away after impact As these data show and with the exception of Examples 3 and 4, the addition of oxetane compound OXT-101 (Comparative Examples 2-5), and the addition of hydrotalcite HTC (Examples 1-4) to the test specimens of Composite A resulted in the retention of a significant level of the original molecular weight distribution of the test specimens compared with that of the control (Comparative Example 1) which contained no stabilizing additive thus demonstrating the stabilizing effectiveness of both the oxetane and the hydrotalcite additive.

As the addition of any additive to a given composite may offer the intended benefit, often times, other effects, (many times detrimental to the properties of the compound) may occur. For engineering resins, the notched Izod impact value of the compound is very important to the application of the product and can be affected by additive selection. Herein, the addition of these additives can, and do, show incidents of both beneficial and negative behavior. Examples 1 and 2 where the stabilizer was formulated to 10000 and 5000 ppm levels respectively, show a negative effect to Izod impact properties. Both composites demonstrate clean breaks at the impact area. However, when the additive level was reduced to 4000 ppm, this property was not as affected.

TABLE 2

HYDROLYSIS STABILITY AND IZOD IMPACT TEST RESULTS FOR COMPOSITE B

| Comparative Example/Example | Stabilizing Additive HTC, ppm | Stabilizing Additive OXT-101, ppm | Hydrolytic Stability as Indicated by Reduction in Mw 0 hr. | Hydrolytic Stability as Indicated by Reduction in Mw 30 hr. | Hydrolytic Stability as Indicated by Reduction in Mw 90 hr. | Hydrolytic Stability as Indicated by Reduction in Mw 192 hr. | Hydrolytic Stability as Indicated by Reduction in Mw 264 hr. | Notched Izod Impact Value (ASTM-256 test protocol) ft/lb/in |
|---|---|---|---|---|---|---|---|---|
| Comparative Example 6 (control) | — | — | 54,000 | 51,000 | 47,000 | 37,000 | 35,000 | 8.8 H |
| Example 5 | 10,000 | — | 55,000 | 51,000 | 50,000 | 46,000 | 47,000 | 7.9 H |
| Example 6 | 5,000 | — | 55,000 | 53,000 | 49,000 | 49,000 | 42,000 | 8.5 H |
| Example 7 | 2,500 | — | 56,000 | 52,000 | 50,000 | 48,000 | 41,000 | 7.7 H |
| Comparative Example 7 | — | 5,000 | 54,000 | 52,000 | 44,000 | 34,000 | 24,000 | 9.5 H |
| Example 8 | 2,500 | 5,000 | 53,000 | 53,000 | 50,000 | 50,000 | 40,000 | 4 B |
| Example 9 | 2,500 | 2,500 | 54,000 | 52,000 | 49,000 | 40,000 | 41,000 | 11.4 H |
| Example 10 | — | 20000 | 55,000 | 52,000 | 46,000 | 38,000 | 33,000 | 7.1 H |

"H" - sample "hinged" upon impact in the notched area
"B" - sample fully fractured away after impact As the foregoing data show, test specimens of Composite B with relatively few exceptions exhibited significant retention of molecular weight distribution across the entire range of exposure periods to moisture at elevated temperature (Examples 5-9).

While additive levels of the oxetane additive do not appear to affect impact properties as much as HTC, the properties are still negatively affected by its addition. However, the combination of both additives (2500/2500 ppm HTC/OXT-101, respectively, in Example 9) appear to show no negative affects from the addition of these materials at these levels as indicated by the Izod impact values).

While the above description contains many specifics, these specifics should not be construed as limitations on the scope of the invention, but merely as exemplifications of preferred embodiments thereof. Those skilled in the art will envision many other possible variations that are within the scope and spirit of the invention as defined by the claims appended hereto.

What is claimed is:

1. A resin composition comprising (i) a normally solid resin which is susceptible to hydrolysis or normally solid resin blend containing at least one normally solid resin component which is susceptible to hydrolysis, (ii) a flame retardant effective amount of at least one phosphate ester flame retardant containing at least one acidic substance, (iii) an acidity-reducing amount of at least one hydrotalcite and, (iv) at least one oxetane, wherein the resin susceptible to hydrolysis is a polycarbonate, blended with an acrylonitrile-butadiene-styrene terpolymer.

2. The resin composition of claim 1 wherein:

the phosphate ester is represented by general formula:

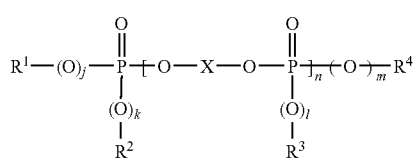

(I)

wherein X is the residue of a $C_2$-$C_{30}$ dihydroxy compound or a $C_6$-$C_{30}$-dihydroxy aryl compound, $R^1$, $R^2$, $R^3$ and $R^4$ each independently is $C_1$-$C_8$-alkyl, $C_3$-$C_8$-cycloalkyl or $C_6$-$C_{20}$-aryl, j, k, l and m each independently is 0 or 1 and n is 0 to 5;

the hydrotalcite is a synthetic or natural mineral represented by the general formula:

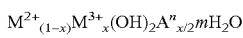

$M^{2+}_{(1-x)}M^{3+}_x(OH)_2A^{n-}_{x/2}mH_2O$ wherein $M^{2+}$ is a divalent metal ion, $M^{3+}$ is a trivalent metal ion, $A^n$ is an n-valent anion, n is an integer greater than 0, and m≧0; and, the oxetane is represented by the general formula:

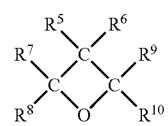

(II)

wherein $R^5$, $R^6$, $R^7$, $R^8$, $R^9$ and $R^{10}$ each independently is hydrogen, $C_1$-$C_{18}$-alkyl, $C_3$-$C_{12}$-cycloalkyl, $C_6$-$C_{15}$-aryl, $C_7$-$C_{15}$-aralkyl or a radical —$CH_2O$—R'', wherein R'' is hydrogen, $C_1$-$C_{18}$-alkyl, $C_3$-$C_{12}$-cycloalkyl, $C_6$-$C_{15}$-aryl, $C_7$-$C_{15}$-aralkyl or an acyl radical of a monobasic or polybasic carboxylic acid or of an inorganic acid.

3. The resin composition of claim 1 wherein the phosphate ester is represented by the general formula:

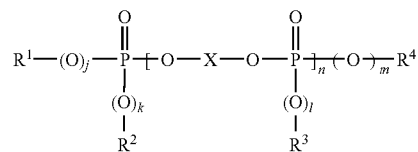

(I)

wherein X is the residue of a $C_2$-$C_{30}$ dihydroxy compound or a $C_6$-$C_{30}$-dihydroxy aryl compound, $R^1$, $R^2$, $R^3$ and $R^4$ each independently is $C_1$-$C_8$-alkyl, $C_3$-$C_8$-cycloalkyl or $C_6$-$C_{20}$-aryl, j, k, l and m each independently is 0 or 1, and n is 0 to 5.

4. The resin composition of claim 3 wherein $R^1$, $R^2$, $R^3$ and $R^4$ each is phenyl and —O—X—O— is derived from bisphenol A, resorcinol or neopentyl glycol.

5. The resin composition of claim 4 wherein j, k, l and m each is 1 and n is 0 to 3.

6. The resin composition of claim 1 wherein the hydrotalcite is a synthetic or natural mineral represented by the general formula:

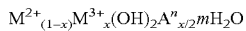

$M^{2+}_{(1-x)}M^{3+}_x(OH)_2A^{n-}_{x/2}mH_2O$ wherein $M^{2+}$ is a divalent metal ion, preferably $Mg^{2+}$, $M^{3+}$ is a trivalent metal ion, preferably $Al^{3+}$, $A''$ is an n-valent anion, preferably $CO_3^{2-}$ or $SO_4^{2-}$, n is an integer greater than 0, preferably 2, x is 0 to 0.5, preferably 0 to 0.33 and m≧0.

7. The resin composition of claim 1 wherein the hydrotalcite is a natural hydrotalcite of the formula $Mg_6Al_2(OH)_{16}CO_3.4H_2O$, a synthetic hydrotalcite selected from the group consisting of $Mg_{0.7}Al_{0.3}(OH)_2(CO_3)_{0.15}.0.54H_2O$, $Mg_{4.5}Al_2(OH)13CO_3.3.5H_2O$, $Mg_{4.2}Al_2(OH)_{12.4}CO_3$, $Mg_{4.3}Al_2(OH)_{12.6}CO_3.4H_2O$, $Zn_6Al_2(OH)_{16}CO_3.4H_2O$, $Ca_6Al_2(OH)_{16}CO_3.4H_2O$, and $Mg_{14}Bi_2(OH)_{29.6}.4.2H_2O$ or mixture thereof.

8. The resin composition of claim 1 wherein the oxetane is represented by the general formula:

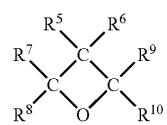

(II)

wherein $R^5$, $R^6$, $R^7$, $R^8$, $R^9$ and $R^{10}$ each independently is hydrogen, $C_1$-$C_{18}$-alkyl, $C_3$-$C_{12}$-cycloalkyl, $C_6$-$C_{15}$- aryl, $C_7$-$C_{15}$-aralkyl or a radical —$CH_2$O—R″, wherein R″ is hydrogen, $C_1$-$C_{18}$-alkyl, $C_3$-$C_{12}$-cycloalkyl, $C_6$-$C_{15}$-aryl, $C_7$-$C_{15}$-aralkyl or an acyl radical of a monobasic or polybasic carboxylic acid or of an inorganic acid.

9. The resin composition of claim 1 wherein the oxetane is represented by the general formula:

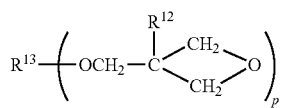
(III)

wherein $R^{12}$ is hydrogen, $C_1$-$C_{18}$-alkyl, $C_1$-$C_{18}$-hydroxyalkyl, $C_6$-$C_{15}$-aryl, ($C_6$-$C_{15}$-aryl)-oxymethyl, $C_7$-$C_{15}$-aralkyl or ($C_7$-$C_{15}$-aralkyl)-oxymethyl, $R^{13}$ is hydrogen, $C_1$-$C_{18}$-alkyl, $C_6$-$C_{15}$-aryl, $C_7$-$C_{15}$-aralkyl or the acyl radical of a monobasic or polybasic carboxylic acid or inorganic acid, and p is an integer which has a value of 1 or is equal to the acid functionality of the acid from which the acid radical $R^{13}$ is derived.

10. The resin composition of claim 1 wherein the oxetane is at least one member of the group consisting of 3-hydroxymethyl-3-methyloxetane, 3-hydroxymethyl-3-ethyloxetane, 3-hydroxymethyl-3-amyloxetane, 3-hydroxymethyl-3-phenoxymethyloxetane, 3-hydroxymethyl-3-p-tert.-butyl-phenoxymethyloxetane, 3,3-bis-hydroxymethyloxetane, 3-hydroxymethyl-3-octyloxetane, 3-hydroxymethyl-3-benzyloxetane, 3-phenoxymethyl-3-ethyloxetane, 3-octadecyloxymethyl-3-ethyloxetane, 3-phenoxymethyl-3-amyloxetane, [3-ethyloxetanyl-(3)]-methyl benzoate, [3-methyl-oxetanyl-(3)]-methyl cinnamate, [3-ethyloxetanyl-(3)]-methyl stearate, [3-amyl-oxetanyl-(3)]-methyl acrylate and esters of polybasic carboxylic acids or inorganic acids.

11. The resin composition of claim 1 wherein the amount of oxetane is such that it will supplement or enhance the acidity-reducing effect of the hydrotalcite component.

\* \* \* \* \*